United States Patent [19]

Baciu et al.

[11] Patent Number: 4,617,618
[45] Date of Patent: Oct. 14, 1986

[54] HEADLAMP REFLECTORS FOR AUTOMOBILE VEHICLES MANUFACTURED BY INJECTION MOLDING ACCORDING TO THE COINJECTION PROCESS USING POLY(ALKYLENE TEREPHTHALATE)

[75] Inventors: Antoine Baciu, Anbevoye, France; Hans Jadamus; Josef Bittscheidt, both of Marl, Fed. Rep. of Germany

[73] Assignees: Cibie Projecteurs, France; Chemische Werke Huls Aktiengesellschaft, Fed. Rep. of Germany

[21] Appl. No.: 585,786

[22] Filed: Mar. 2, 1984

[30] Foreign Application Priority Data

Mar. 7, 1983 [FR] France ............................. 83 03684

[51] Int. Cl.[4] .............................................. F21V 7/00
[52] U.S. Cl. ................................. 362/341; 264/328.18
[58] Field of Search ................... 264/328.18; 362/296, 362/341, 347, 61

[56] References Cited

U.S. PATENT DOCUMENTS

| 3,644,271 | 2/1972 | Tulley | 264/328.18 |
| 4,250,078 | 2/1981 | McFarlane et al. | |
| 4,404,161 | 9/1983 | Bier | 264/328.18 |

FOREIGN PATENT DOCUMENTS

| 0043797 | 6/1981 | European Pat. Off. | |
| 0125743 | 7/1983 | Japan | 264/328.18 |

Primary Examiner—Craig R. Feinberg
Assistant Examiner—David A. Okonsky
Attorney, Agent, or Firm—McCormick, Paulding & Huber

[57] ABSTRACT

The invention relates to a headlamp reflector for an automobile vehicle manufactured by injection molding according to the coinjection process using poly(alkylene terephthalate) having a viscosity number (DIN 16,779) of between 60 and 180 cm$^3$/g. It is characterized by the fact that the core contains some 15 to 75% by weight of hematite, at least 75% of the hematite having a particle size less than 70 $\mu$m. Good mechanical strength and good behavior in respect of temperature.

4 Claims, No Drawings

HEADLAMP REFLECTORS FOR AUTOMOBILE VEHICLES MANUFACTURED BY INJECTION MOLDING ACCORDING TO THE COINJECTION PROCESS USING POLY(ALKYLENE TEREPHTHALATE)

FIELD OF THE INVENTION

The present invention relates to headlamp reflectors for automobile vehicles manufactured by injection molding according to the coinjection process using poly(alkylene terephthalate) with a viscosity number (DIN 16,779) of between 60 and 180 cm$^3$/g.

PRIOR ART

Hitherto, headlamp reflectors for automobile vehicles have normally been manufactured from metal sheet by stamping. After this operation, a layer of varnish and a deposit of aluminum vaporized under vacuum providing the reflecting function, are applied. Because of the limited possibilities of the shaping, these headlamp reflectors in use at present provide only a small number of simple geometrical shapes.

Modern automobiles create an increasing requirement for headlamp reflectors with complex geometry. It is no longer possible to manufacture such headlamp reflectors for automobile vehicles from metal sheet profitably.

Such parts can only be manufactured from thermosetting materials or, if appropriate, thermoplastic materials. However, the possibilities of using these materials remain small unless additional measures are taken.

Headlamp reflectors for automobile vehicles made from thermosetting plastics do not provide the polished surface necessary for a good optical performance. This is why additional operations must be carried out before the application of the reflective layer, for example the application of an intermediate layer.

Thermoplastics, on the other hand, insofar as they are not reinforced, make it possible to obtain reflectors for automobile vehicles with a polished surface. Under the effect of a hot source of light, the parts tend to expand and dilate so that the legally stipulated direction of the light beam is modified in service to an unacceptable degree. The specification TRANS/SC1 WP29/R 184 defines the acceptable variations of the direction of a light beam.

The solution which at present is the most favorable from the point of view of economics and technology, but nevertheless has restricted use, being suitable for example for reflectors which are parabolic in revolution, is that offered by the injection molding of thermoplastics such as poly(alkylene terephthalates) incorporating additives which improve the dimensional stability of the working part, without however detracting from the surface quality. Such additives are described, among others, in the published applications DE 2,910,643 or EP 0,043,797. But they can only be employed so long as the surface quality is not modified in an unfavorable manner. The heat resistance of such headlamp reflectors for automobile vehicles is therefore necessarily limited.

The headlamp reflectors for automobiles described above can meet the specification requirements when bilux bulbs (European Code—EEC Regulation No. 2) are employed. However, halogen bulbs (EEC Regulations No. 8 and No. 20), which are preferred because of their superior light output and their longer life, cannot be employed; the dimensional stability of the materials employed is inadequate at the high temperatures produced by such light sources.

In principle, it is possible to reinforce the materials referred to above, for example with particularly effective additives such as glass fibers or carbon fibers, until they have an adequate dimensional stability to heat. However, in this case, the surface of the reflectors is not satisfactory so that a perfect reflection is as difficult to obtain as with thermosetting materials. Furthermore, already on being withdrawn from the mold cavity, the molded article undergoes an unacceptable distortion as a result of anisotropic shrinkage phenomena.

Finally, it is known to produce headlamp reflectors for automobile vehicles with a polished surface from the thermoplastic materials mentioned, which are provided with a skin of a usually unreinforced thermoplastic, produced by means of the process called a coinjection process or a sandwich injection molding process. However, this process as well is incapable of eliminating the tendency to distortion, described already.

The problem which is solved by the present invention is to avoid the known disadvantages of the state of the art.

SUMMARY OF THE INVENTION

It has been possible to solve the problem which is posed by the use of a core layer consisting of poly(alkylene terephthalate) containing from 15 to 75% by weight, preferably 30 to 60% of hematite, this percentage by weight relating to the total mixture.

DETAILED DESCRIPTION OF THE INVENTION

The preferred poly(alkylene terephthalates) are poly(ethylene terephthalate) and poly(butylene terephthalate). Poly(ethylene terephthalate) offers the advantage of a better dimensional stability to heat, poly(butylene terephthalate) the advantage of suitability for economical molding.

The poly(alkylene terephthalates) have a viscosity number (DIN 16,779) of between 60 and 180 cm$^3$/g.

The molecular weights of the poly(alkylene terephthalates) employed for the core and the skin usually have the same value. In the case where these molecular weights have different values, the molecular weight of the polyester used for the skin should have a value which is higher than that of the polyester used for the core.

Homopoly(ethylene terephthalate) or, where appropriate, homopoly(butylene terephthalate) are employed in general. Regarding the polyesters which form the skin in particular, it is possible to replace a molar percentage of up to 10% of terephthalic acid with other dicarboxylic acids such as isophthalic acid, sebacic acid, azelaic acid, dodecanedicarboxylic acid, or similar, and a molar percentage of up to 10% of ethylene glycol or, where appropriate, of butylene glycol which is added, with other diols such as, among others, 1,4-cyclohexanedimethanol or neopentyl glycol.

The filler (charge) employed according to the invention for the poly(alkylene terephthalate) for the core is hematite which represents from 15 to 75%, preferably from 30 to 60%—percentage by weight—of the total mixture. At least 75% of the hematite employed according to the invention should have a particle size (sieve pass) <70 μm. Preferably, hematites at least 90% of whose particles have a particle size <70 μm are employed. The hematites which are generally sold in commerce contain approximately from 85 to 90% by weight of Fe$_2$O$_3$, the remainder consisting of oxide compounds of silicon, aluminum, calcium and magnesium.

In addition to the hematite filler resulting from the invention, other filling materials may be employed: glass fibers, microbeads, mica, chalk, kaolin, talc, graphite, and the like. The other filler materials may replace up to 25% of the hematite provided that the total mixture of poly(alkylene terephthalate) and filler material comprises at least 15% by weight of hematite.

The poly(alkylene terephthalate) employed for the skin may be mixed with filler materials so long as the surface quality is not altered. An example of a suitable filler material is titanium dioxide preferably in an amount of up to 30% by weight of the total mixture.

According to a general embodiment, the poly(alkylene terephthalates) intended for the manufacture of headlamp reflectors for automobiles are chosen as follows:

A. For the skin:

Use of an unfilled homopoly(butylene terephthalate) with a viscosity number of between 110 and 160 cm$^3$/g.

B. For the core:

The core is made of a molding material containing from 40 to 70% of homopoly(butylene terephthalate), up to 20% of milled glass fibers and from 30 to 50% of hematite—percentages by weight. The viscosity number of the polyester is in a range between 90 and 120 cm$^3$/g.

The diameter of the glass fibers is generally from 9 to 16 μm. At least half of the glass fibers have a fiber length <200 μm.

EXAMPLES (1) A hompoly(butylene terephthalate) with a viscosity number of 135 cm$^3$/g is employed for the skin.

(2) A homopoly(butylene terephthalate) with a viscosity number of 115 cm$^3$/g is employed to produce the molding material intended for the core.

(3) The filler materials employed are:

a. Hematite:

a commercial product is used (density: 4.9 g/cm$^3$; specific surface: 0.312 m$^2$/cm$^3$; mean particle diameter: 40 μm.)

b. Mica 1:

a commercial product is used (density: 2.9 g/cm$^3$; specific surface: 0.212 m$^2$/cm$^3$; mean particle diameter: 82 μm.)

c. Mica 2:

a commercial product is used (density: 2.9 g/cm$^3$; specific surface: 0.212 m$^2$/cm$^3$; mean particle diameter: μm.)

(4) The glass fibers employed are a commercial product with a diameter of 10 μm and a mean fiber length of 100 μm.

MANUFACTURE OF THE MOLDING MATERIAL INTENDED FOR THE CORE

The present homopoly(butylene terephthalate) in the form of granules is poured into the first opening of a continuous screw blender equipped with two feed openings (barrel temperature: 240° C.). The filler materials and the glass fibers are added, after being measured, into the second opening. The moldable material is discharged as a rod, cooled and granulated. The granules are dried until they reach a residual moisture 0.02%.

The attached table shows the production of reflectors from materials according to the invention (Examples 1 and 2), that is to say filled substantially with hematite (Examples 1 and 2) and, on the other hand, with one of the materials of the prior art (mica).

The reflectors thus manufactured have the following dimensions:

outline of rectangular opening; width 220 mm; height 116 mm;

focal distance: 26.5 mm;

wall thickness: 2.5 mm.

They are produced by coinjection molding under the following conditions:

with regard to the skin:

temperature: 240°–270° C.

pressure: 675 bars with regard to the core:

temperature: 230°–250° C.

pressure: 1000 bars

The reflectors thus manufactured are examined in respect of the dimensional quality and heat stability:

with regard to the size quality, after the reflector is withdrawn from the mold and cooled, an examination is made to see if the reflector has a twist, that is to say a torsion round its axis. The results are shown in the attached table in the column "good shape without a twist". It is seen that for Examples 1 and 2 according to the invention ninety-four reflectors out of a hundred show no twist. This proportion drops to seventeen and twenty-eight for the reference reflectors A and B.

with regard to the heat stability, the headlamps are fitted with bulbs operating with cut-off illumination. After 20 minutes' operation, the lowering of the cut-off limit between the cold state and the hot state is noted (by observation on a screen). Such a method has been specified in a European Economic Community Standard, known as GTB (Groupe de Travail de Bruxelles—Brussels Working Group).

The attached table shows in its last column the variation of GTB cut-off, expressed as percentage of angles (tangent values). It is seen that for Examples 1 and 2 according to the invention the detected variation is much smaller than for the reference reflectors of Examples A and B.

In conclusion, it is seen that the use of hematite as a filler, according to the invention, clearly improves the size stability and the heat behavior of the headlamps according to the invention.

| | MOLDABLE MATERIAL FOR THE CORE | | | | | | MOLDABLE MATERIAL FOR THE SKIN HOMO(BUTYLENE TEREPHTHALATE) Viscosity number (cm³/g) | GOOD SHAPE WITHOUT TWIST | GTB CUT-OFF OPERATION |
|---|---|---|---|---|---|---|---|---|---|
| | HOMO(BUTYLENE TEREPHTHALATE) | | FILLING MATERIAL | | GLASS FIBERS | | | | |
| TEST No. | Viscosity number (of moldable material) cm³/g | Quantity (% by weight) | | Quantity (% by weight) | | Quantity (% by weight) | | | |
| 1 | 110 | 50 | Hematite | 40 | Milled fibers | 10 | 135 | 94% | +0.05% |
| 2 | 108 | 40 | Hematite | 60 | Milled fibers | 10 | 135 | 94% | +0.04% |
| A | 104 | 60 | Mica 1 | 30 | Milled fibers | 10 | 135 | 17% | +0.08% |
| B | 105 | 60 | Mica 2 | 40 | Milled fibers | 10 | 135 | 28% | +0.08% |

What is claimed is:

1. Headlamp reflector for an automobile vehicle manufactured by injection molding by the process of coinjection of polyalkylene terephthalate with a viscosity number of between 60 and 180 cm³/g, in which the core comprises from 15 to 75% by weight of hematite, at least 75% of the hematite having a particle size less than 70 μm.

2. Headlamp reflector for an automobile vehicle as claimed in claim 1, in which the skin comprises up to 30% by weight of TiO$_2$.

3. Headlamp reflector for an automobile vehicle as claimed in claim 1, in which the core comprises from 30 to 60% by weight of hematite.

4. Headlamp reflector for an automobile vehicle as claimed in claim 3, in which the skin comprises up to 30% by weight of TiO$_2$.

* * * * *